(12) United States Patent
Fremont

(10) Patent No.: US 10,781,958 B2
(45) Date of Patent: Sep. 22, 2020

(54) LOW PEAK INSERTION TUBE END FORM

(71) Applicant: Oetiker NY, Inc., Lancaster, NY (US)

(72) Inventor: Bradley C. Fremont, Tonawanda, NY (US)

(73) Assignee: Oetiker NY, Inc., Lancaster, NY (US)

(*) Notice: Subject to any disclaimer, the term of this patent is extended or adjusted under 35 U.S.C. 154(b) by 170 days.

(21) Appl. No.: 15/799,392

(22) Filed: Oct. 31, 2017

(65) Prior Publication Data
US 2019/0128460 A1    May 2, 2019

(51) Int. Cl.
*F16L 37/04* (2006.01)
*F16L 47/12* (2006.01)
*F16L 47/16* (2006.01)
*F16L 47/08* (2006.01)
*F16L 37/088* (2006.01)

(52) U.S. Cl.
CPC ............... *F16L 47/12* (2013.01); *F16L 37/04* (2013.01); *F16L 37/0885* (2019.08); *F16L 47/08* (2013.01); *F16L 47/16* (2013.01)

(58) Field of Classification Search
CPC ............................... F16L 37/04; F16L 37/088
USPC ......................................... 285/321, 305, 276
See application file for complete search history.

(56) References Cited

U.S. PATENT DOCUMENTS

| | | | |
|---|---|---|---|
| 2,805,089 A * | 9/1957 | Hansen | F16L 37/088 285/317 |
| 3,345,087 A * | 10/1967 | Hanes | A01K 63/04 285/321 |
| 3,450,424 A | 6/1969 | Calisher | |
| 3,817,561 A | 6/1974 | Kay | |
| 4,004,446 A | 1/1977 | Dalgleish et al. | |
| 4,557,508 A | 12/1985 | Walker | |
| 4,832,378 A * | 5/1989 | Zepp | F16L 37/12 285/305 |
| 4,913,467 A | 4/1990 | Washizu | |
| 4,978,150 A * | 12/1990 | Schoot | F16L 37/084 285/304 |
| 5,401,000 A | 3/1995 | Tsay | |
| 5,570,910 A * | 11/1996 | Highlen | F16L 37/088 285/308 |
| 5,806,898 A | 9/1998 | Hollnagle | |
| 6,378,908 B1 * | 4/2002 | Walker | F16L 37/088 285/321 |
| 7,614,666 B2 | 11/2009 | Eggert et al. | |
| 8,113,549 B2 | 2/2012 | Bokeuhn et al. | |
| D701,304 S | 3/2014 | Lair et al. | |

(Continued)

FOREIGN PATENT DOCUMENTS

| | | |
|---|---|---|
| EP | 3020446 | 5/2016 |
| FR | 3041059 | 9/2015 |

(Continued)

*Primary Examiner* — David Bochna
(74) *Attorney, Agent, or Firm* — Simpson & Simpson, PLLC

(57) ABSTRACT

A tube end form, including a first section including a first radially outward facing surface, a second section including a second radially outward facing surface, and a shoulder axially arranged between the first and second sections, the shoulder including a first frusto-conical surface arranged at a first angle relative to the first radially outward facing surface, and a second frusto-conical surface arranged at a second angle relative to the first radially outward facing surface.

19 Claims, 10 Drawing Sheets

(56) References Cited

U.S. PATENT DOCUMENTS

| | | | |
|---|---|---|---|
| 8,746,750 B2* | 6/2014 | Gilbreath | F16L 37/088 |
| | | | 285/276 |
| 9,464,741 B2 | 10/2016 | Lewis et al. | |
| D785,790 S | 5/2017 | Lewis et al. | |
| 2004/0041394 A1* | 3/2004 | Dahms | F16L 37/088 |
| | | | 285/39 |
| 2004/0103946 A1 | 6/2004 | Nanni, Jr. et al. | |
| 2004/0232696 A1 | 11/2004 | Andre | |
| 2006/0108793 A1 | 5/2006 | McGee et al. | |
| 2006/0273577 A1 | 12/2006 | Stewart | |
| 2008/0100062 A1 | 5/2008 | Aston | |
| 2008/0224469 A1 | 9/2008 | Ostergren et al. | |
| 2009/0045619 A1* | 2/2009 | Tajika | F02M 37/0017 |
| | | | 285/91 |
| 2009/0108580 A1 | 4/2009 | Hoffman | |
| 2009/0140519 A1 | 6/2009 | Pavnaskar et al. | |
| 2009/0218807 A1 | 9/2009 | Seryi | |
| 2009/0227954 A1 | 9/2009 | Loiterman et al. | |
| 2010/0052313 A1 | 3/2010 | Ishida et al. | |
| 2010/0056975 A1 | 3/2010 | Dale et al. | |
| 2010/0127493 A1 | 5/2010 | Felder | |
| 2010/0140920 A1 | 6/2010 | Kloss et al. | |
| 2010/0194102 A1* | 8/2010 | Keeling | F16L 37/091 |
| | | | 285/305 |
| 2011/0079999 A1 | 4/2011 | LeQuere | |
| 2013/0049351 A1 | 2/2013 | Chen | |
| 2013/0227831 A1 | 9/2013 | Nienhuis | |
| 2015/0102599 A1 | 4/2015 | Guest | |
| 2015/0192235 A1 | 7/2015 | Blanchard et al. | |
| 2015/0316189 A1 | 11/2015 | Dhotre et al. | |
| 2016/0040635 A1 | 2/2016 | Satarino | |
| 2016/0051809 A1 | 2/2016 | Schuetz | |
| 2016/0069495 A1 | 3/2016 | Statler, II et al. | |
| 2016/0178101 A1 | 6/2016 | Blake et al. | |
| 2017/0021723 A1 | 1/2017 | Visarius et al. | |
| 2017/0114935 A1 | 4/2017 | Kujawski, Jr. et al. | |
| 2017/0120403 A1 | 5/2017 | Williams et al. | |
| 2017/0159863 A1 | 6/2017 | Smith et al. | |

FOREIGN PATENT DOCUMENTS

| | | |
|---|---|---|
| WO | WO2015/184363 | 12/2012 |
| WO | WO2016/129341 | 8/2016 |
| WO | WO2017/034715 | 3/2017 |
| WO | WO2017/041175 | 3/2017 |
| WO | WO2017/064552 | 4/2017 |

* cited by examiner

LOW PEAK INSERTION TUBE END FORM

FIELD

The present disclosure relates to a tube end form for a fluid connector, and, more particularly, to a tube end form for a fluid connector including sections having different frusto-conical or curved surfaces arranged on the tube end form to change the force required to insert the tube end form into the fluid connector.

BACKGROUND

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors.

Traditional tube end forms comprise a straight ramp, which extends radially outward and axially on the outer surface of the tube end form, to displace a wire clip within the fluid connector to secure the tube end form within the fluid connector. FIG. 5 is a side elevational view of prior art tube end form 220. Tube end form 220 comprises end 222, section 223, shoulder 227, section 229, and end 232. Section 223 is arranged between end 222 and shoulder 227 and comprises radially outward facing surface 224. Radially outward facing surface 224 includes a substantially constant diameter. Shoulder 227 is arranged between section 223 and section 229 and comprises radially outward facing surface 226. Radially outward facing surface 226 is a linear conical shape and increases in diameter in axial direction AD1. Section 229 is arranged between shoulder 227 and end 232 and comprises radially outward facing surface 230. Radially outward facing surface 230 includes a substantially constant diameter. Shoulder 227 is connected to radially outward facing surface 230 via shoulder surface 28. Tube end form 220 is arranged to be inserted, specifically with end 222 first, into a fluid connector. Since prior art tube end forms utilize a straight ramp (i.e., constant linear ramp), the insertion effort increases linearly until the clip snaps over the shoulder of the tube end form. In this case, the length and height of the ramp determine the maximum insertion force felt.

Thus, there has been a long-felt need for a tube end form having a variable ramp to reduce the peak force of insertion.

SUMMARY

According to aspects illustrated herein, there is provided a tube end form, comprising a first section including a first radially outward facing surface, a second section including a second radially outward facing surface, and a shoulder axially arranged between the first and second sections, the shoulder including a first frusto-conical surface arranged at a first angle relative to the first radially outward facing surface, and a second frusto-conical surface arranged at a second angle relative to the first radially outward facing surface.

According to aspect illustrated herein, there is provided a tube end form, comprising a first section including a first radially outward facing surface, a second section including a second radially outward facing surface, and a shoulder axially arranged between the first and second sections, the shoulder including an arcuate surface extending from the first radially outward facing surface.

According to aspect illustrated herein, there is provided a fluid connection coupling, comprising a fluid connector, including a snap ring, and a radially inward facing surface, and a tube end form, including a first section including a first radially outward facing surface, a second section including a second radially outward facing surface, and a shoulder axially arranged between the first and second sections, the shoulder including a first frusto-conical surface arranged at a first angle relative to the first radially outward facing surface, and a second frusto-conical surface arranged at a second angle relative to the first radially outward facing surface, the second angle being less than the first angle, wherein in a first insertion state, the first frusto-conical surface engages the snap ring, and in a second insertion state, the second frusto-conical surface engages the snap ring.

In order to further encourage assemblers to fully insert the tube end form within the fluid connector, the present invention utilizes a ramp geometry which comprises a steep initial frusto-conical surface, followed by a second frusto-conical surface which has a shallower angle. This ramp geometry reduces the peak insertion force of the tube end form, with a trade-off of an increased initial effort when compared to traditional straight ramp tube end forms.

Another embodiment of the ramp geometry includes utilizing a curved ramp, comprising an steep initial curve which transitions to a horizontal surface at the termination of the curve. In some cases, the insertion effort can be lowered as the insertion event continues, encouraging the user to "follow through" and fully seat the tube end form in the fluid connector.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
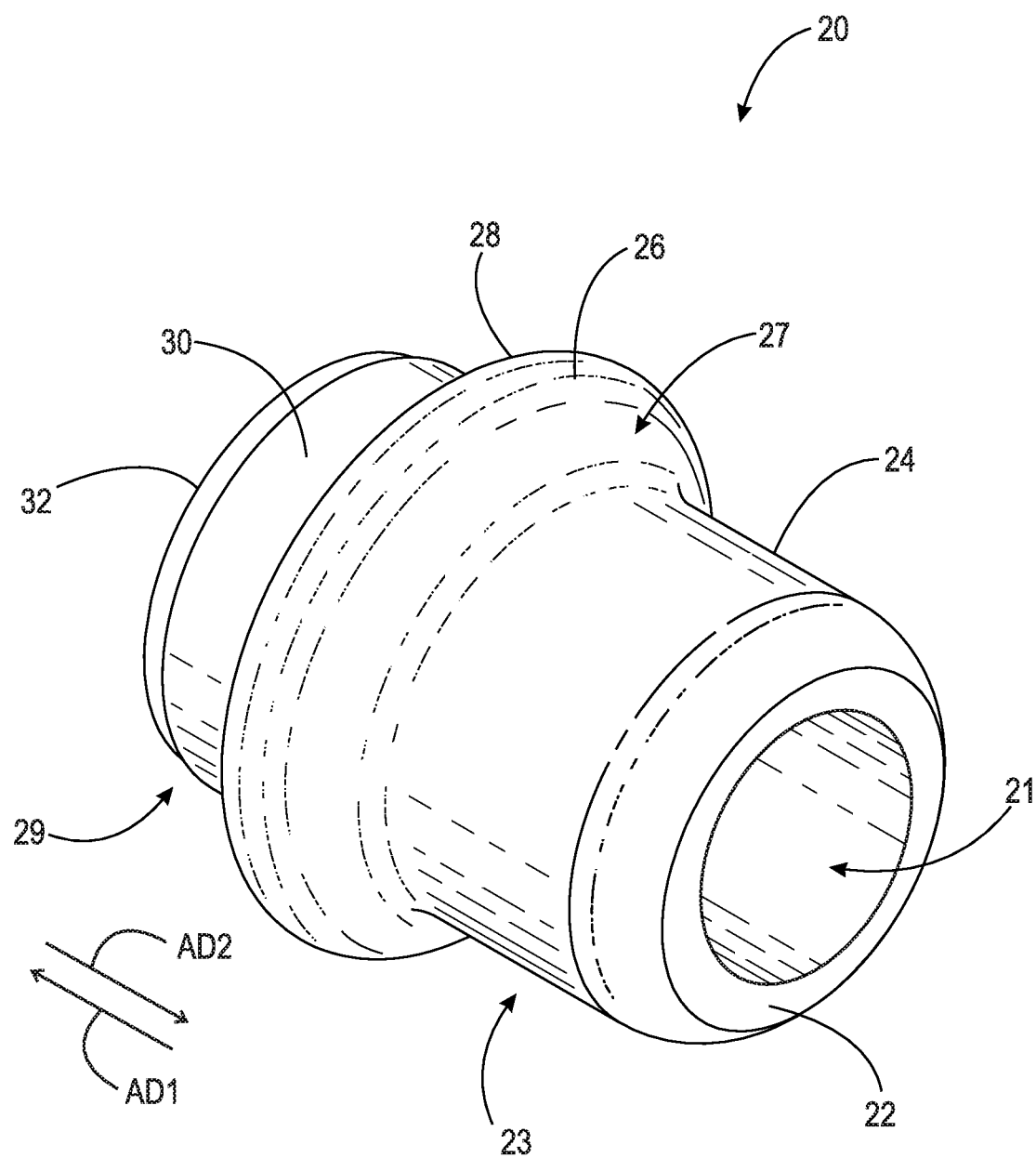
FIG. 1 is a perspective view of a tube end form.

Adverting now to the figures, FIG. 1 is a perspective view of tube end form 20. Tube end form 20 is generally cylindrical and comprises end 22, section 23, shoulder 27, section 29, end 32, and through-bore 21. Through-bore 21 extends through tube end form 20 from end 22 to end 32. Section 23 is arranged between end 22 and shoulder 27 and comprises radially outward facing surface 24. Radially outward facing surface 24 includes a substantially constant diameter. In an example embodiment, radially outward facing surface 24 includes a variable diameter. Shoulder 27 is arranged between section 23 and section 29 and comprises radially outward facing surface 26. Radially outward facing surface 26 is generally a non-linear conical shape and increases in diameter in axial direction AD1, as will be discussed in greater detail with respect to FIGS. 3A-D. Section 29 is arranged between shoulder 27 and end 32 and comprises radially outward facing surface 30. Radially outward facing surface 30 includes a substantially constant diameter. In an example embodiment, radially outward facing surface 30 includes a variable diameter. Shoulder 27 is connected to radially outward facing surface 30 via shoulder surface 28. In an example embodiment, the diameter of radially outward facing surface 24 is equal to the diameter of radially outward facing surface 30. In an example embodiment, the diameter of radially outward facing surface 24 is not equal to the diameter of radially outward facing surface 30. Tube end form 20 is arranged to be inserted, specifically with end 22 first, into a fluid connector (see FIGS. 4A-D). It should be appreciated that tube end forms 40, 60, and 80 are substantially similar to tube end form 20.

Figure 2A:
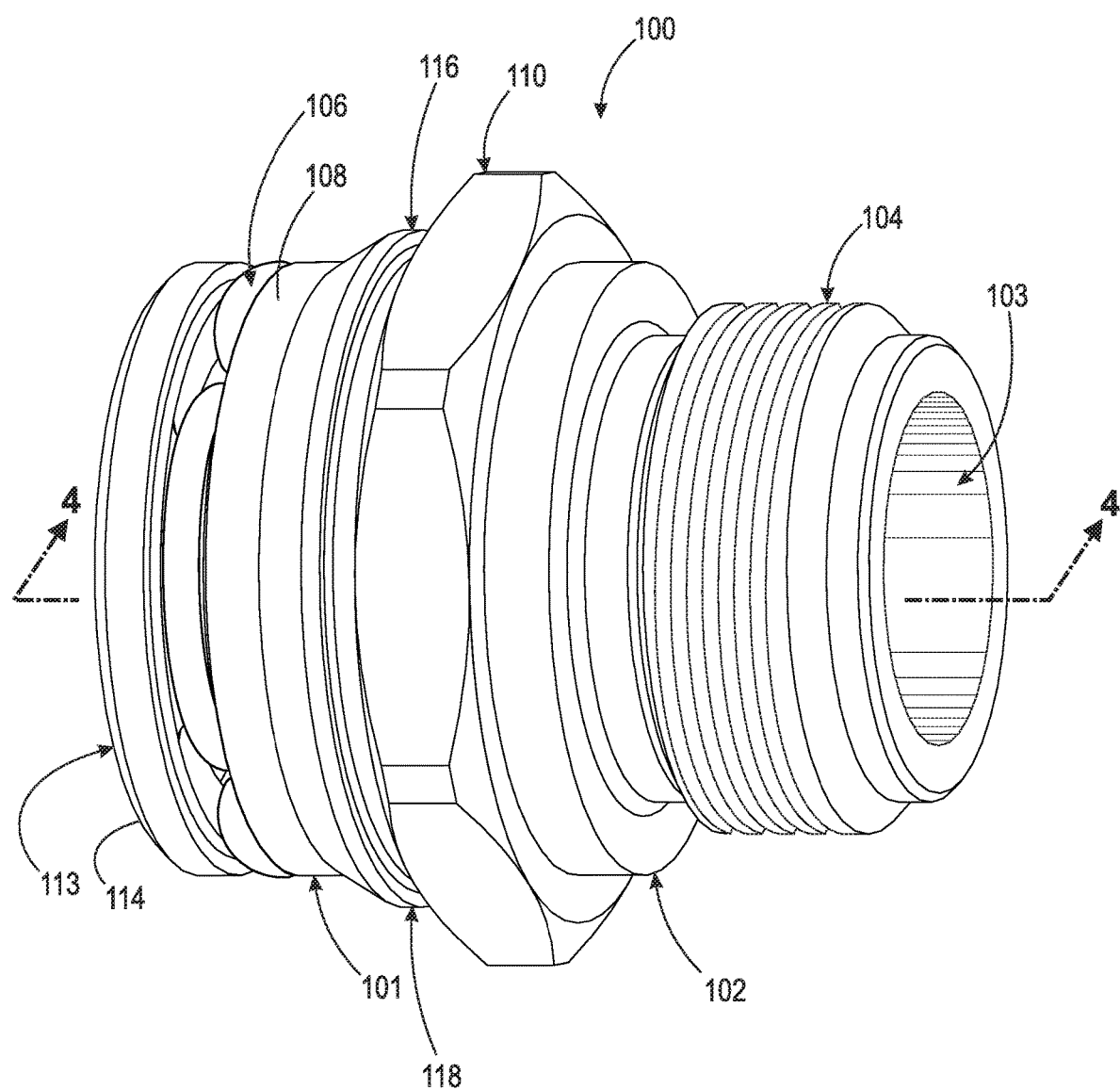
FIG. 2A is a front perspective view of a fluid connector.
Figure 2B:
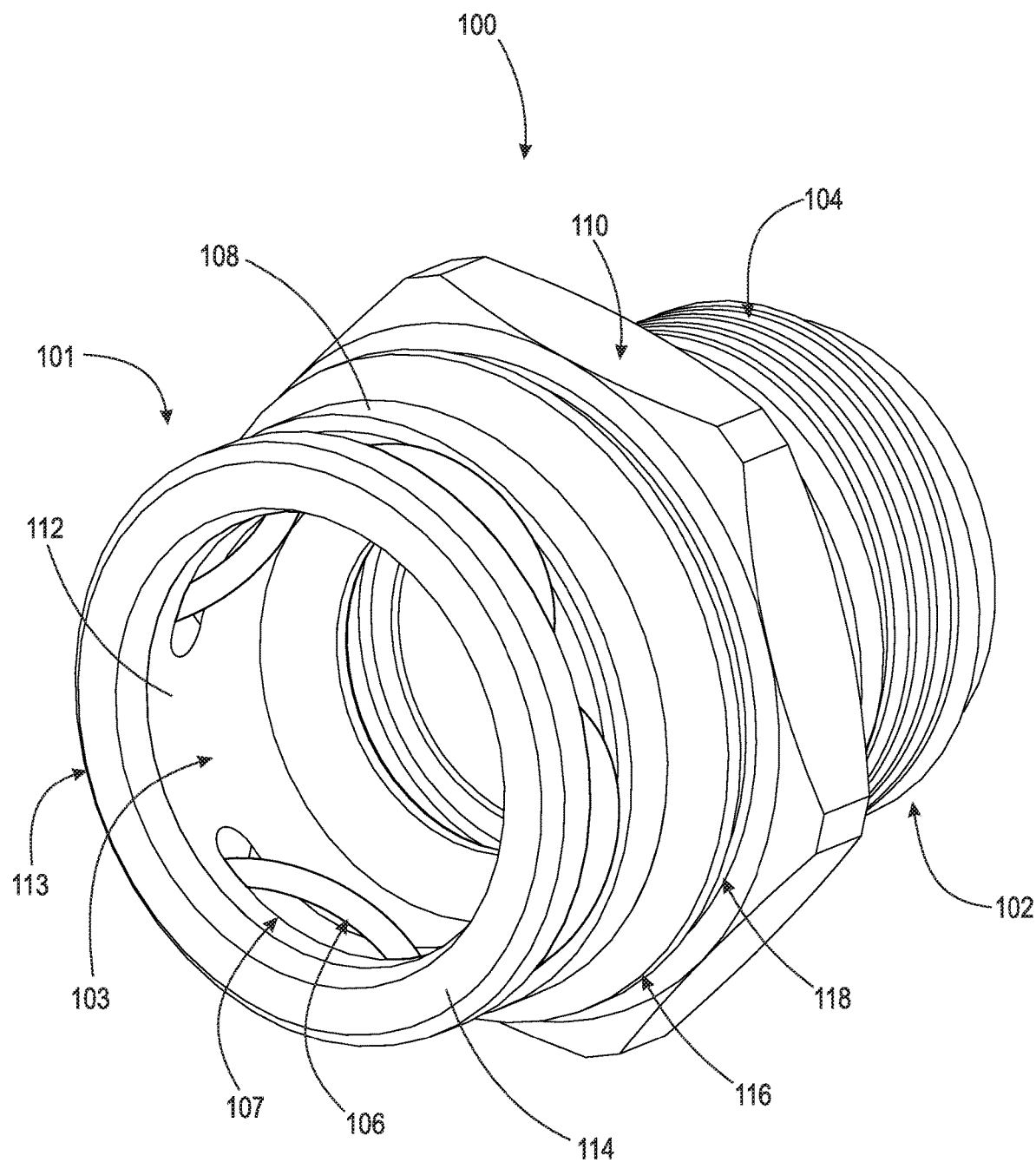
FIG. 2B is a rear perspective view of the fluid connector shown in FIG. 2A.

FIG. 2A and FIG. 2B are a front perspective view and a rear perspective view of fluid connector 100, respectively. Fluid connector 100 comprises section 101 and section 102. Section 101 includes snap ring 106, outer surface 108, inner surface 112, shoulder 113, and shoulder surface 114, shoulder 116, and channel 118. Snap ring 106 is arranged within apertures 107 of fluid connector 100 and secures tubular connector 20 (shown in FIG. 4A) within through-bore 103 of fluid connector 100. Section 102 of fluid connector 100 comprises threads 104 which allow fluid connector 100 to secure to an apparatus such as a transmission, radiator, oil cooler, etc. Fluid connector 100 also includes head 110 which allows a user to use a tool such as a wrench to screw fluid connector 100 into a corresponding apparatus (not shown). Through-bore 103 is arranged in the center of fluid connector 100 and passes through the whole body of fluid connector 100. Fluid connector 100 further comprises radially inward facing surface 128 and radially inward facing surface 130 (shown in FIGS. 4A-D). Radially inward facing surface is preferably conical, and increases/decreases in diameter in a first axial direction.

Figure 3A:
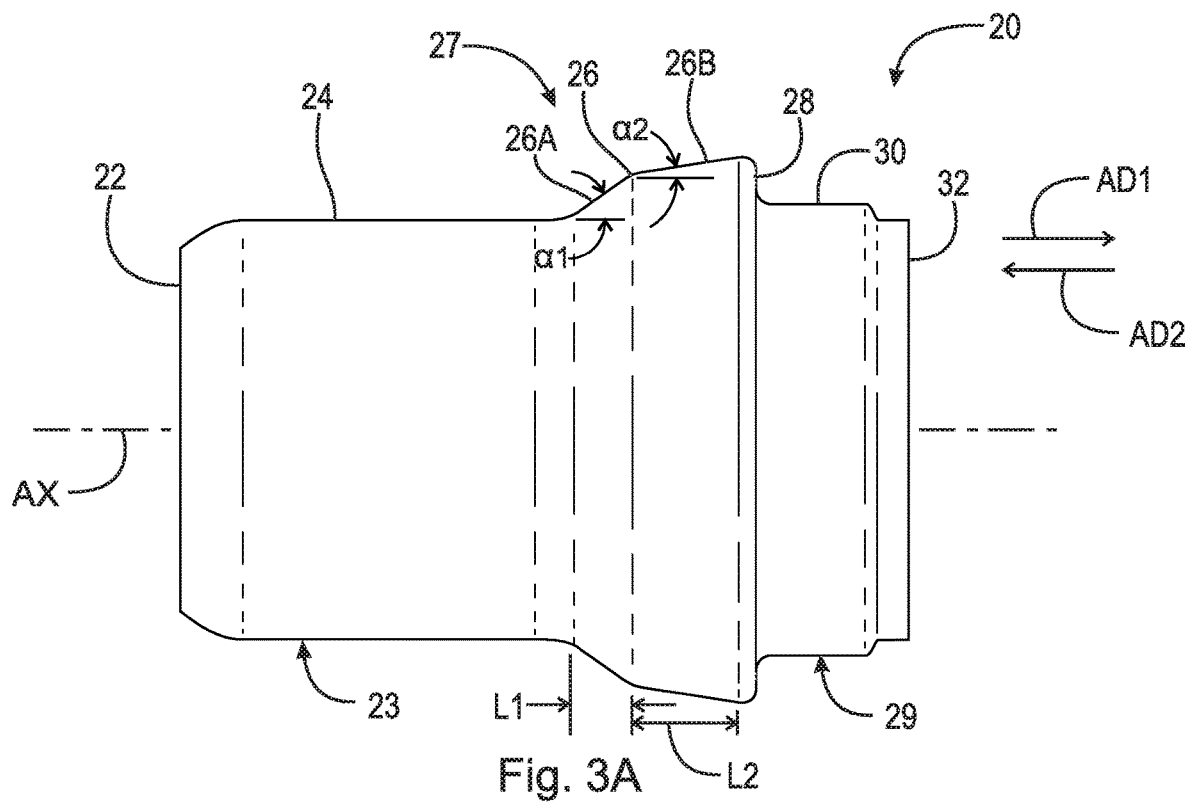
FIG. 3A is a side elevational view of the tube end form shown in FIG. 1.

FIG. 3A is a side elevational view of tube end form 20. Tube end form 20 is generally cylindrical and comprises end 22, section 23, shoulder 27, section 29, and end 32. Section 23 is arranged between end 22 and shoulder 27 and comprises radially outward facing surface 24. Radially outward facing surface 24 includes a substantially constant diameter. In an example embodiment, radially outward facing surface 24 includes a variable diameter. Shoulder 27 is arranged between section 23 and section 29 and comprises radially outward facing surface 26. Section 29 is arranged between shoulder 27 and end 32 and comprises radially outward facing surface 30. Radially outward facing surface 30 includes a substantially constant diameter. In an example embodiment, radially outward facing surface 30 includes a variable diameter. Shoulder 27 is connected to radially outward facing surface 30 via shoulder surface 28. In an example embodiment, the diameter of radially outward facing surface 24 is equal to the diameter of radially outward facing surface 30. In an example embodiment, the diameter of radially outward facing surface 24 is not equal to the diameter of radially outward facing surface 30.

Radially outward facing surface 26 is generally a non-linear conical shape and increases in diameter in axial direction AD1. Radially outward facing surface 26 includes conical surface 26A and conical surface 26B. Conical surface 26A is arranged at angle α1 relative to horizontal axis AX, and has an adjacent side dimension of length L1. Conical surface 26B is arranged at angle α2 relative to horizontal axis AX, and has an adjacent side dimension of length L2. In the embodiment shown, angle α1 is not equal to α2 and length L1 is not equal to L2. In an example embodiment, α1 is 35° and α2 is 10°. In an example embodiment, radially outward facing surface 26 may comprise three or more conical surfaces.

The profile of radially outward facing surface 26 manipulates the insertion force by reducing the peak force with a slight increase in initial effort. Specifically, initial insertion force is increased with a steeper slope, and peak effort is reduced with a shallower angle. In some cases, the insertion effort can be lowered as the insertion event continues, encouraging the user to continue inserting the tube end form until the tube end form is fully seated in the fluid connector. This same effect is achieved with tube end forms 40, 60, and 80, which are described below.

Figure 3B:
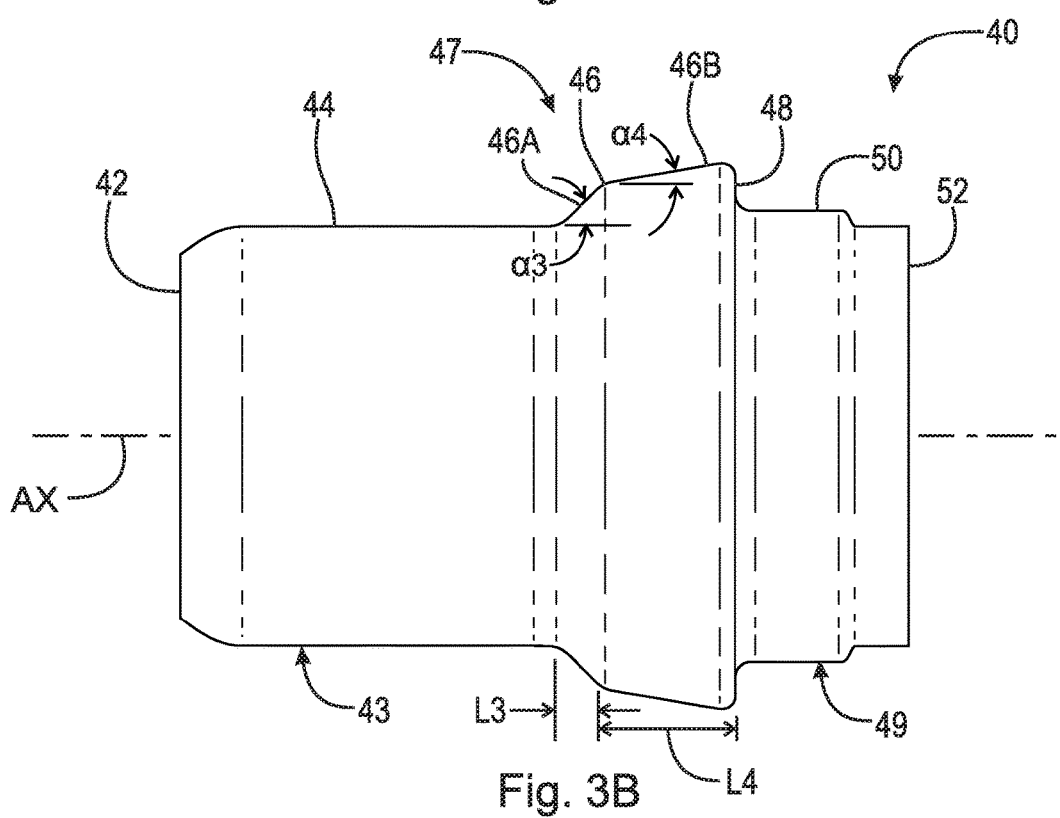
FIG. 3B is a side elevational view of a tube end form.

FIG. 3B is a side elevational view of a tube end form 40. Tube end form 40 is generally cylindrical and comprises end 42, section 43, shoulder 47, section 49, and end 52. Section 43 is arranged between end 42 and shoulder 47 and comprises radially outward facing surface 44. Radially outward facing surface 44 includes a substantially constant diameter. In an example embodiment, radially outward facing surface 44 includes a variable diameter. Shoulder 47 is arranged between section 43 and section 49 and comprises radially outward facing surface 46. Section 49 is arranged between shoulder 47 and end 52 and comprises radially outward facing surface 50. Radially outward facing surface 50 includes a substantially constant diameter. In an example embodiment, radially outward facing surface 50 includes a variable diameter. Shoulder 47 is connected to radially outward facing surface 50 via shoulder surface 48. In an example embodiment, the diameter of radially outward facing surface 44 is equal to the diameter of radially outward facing surface 50. In an example embodiment, the diameter of radially outward facing surface 44 is not equal to the diameter of radially outward facing surface 50.

Radially outward facing surface 46 is generally a non-linear conical shape and increases in diameter in axial direction AD1. Radially outward facing surface 46 includes conical surface 46A and conical surface 46B. Conical surface 46A is arranged at angle α3 relative to horizontal axis AX, and has an adjacent side dimension of length L3. Conical surface 46B is arranged at angle α4 relative to horizontal axis AX, and has an adjacent side dimension of length L4. In the embodiment shown, angle α3 is not equal to α4 and length L3 is not equal to L4. In an example embodiment, α1 is 25° and α2 is 20°. It should be appreciated, that L3 is less than L1. In an example embodiment, radially outward facing surface 46 may comprise three or more conical surfaces.

Figure 3C:
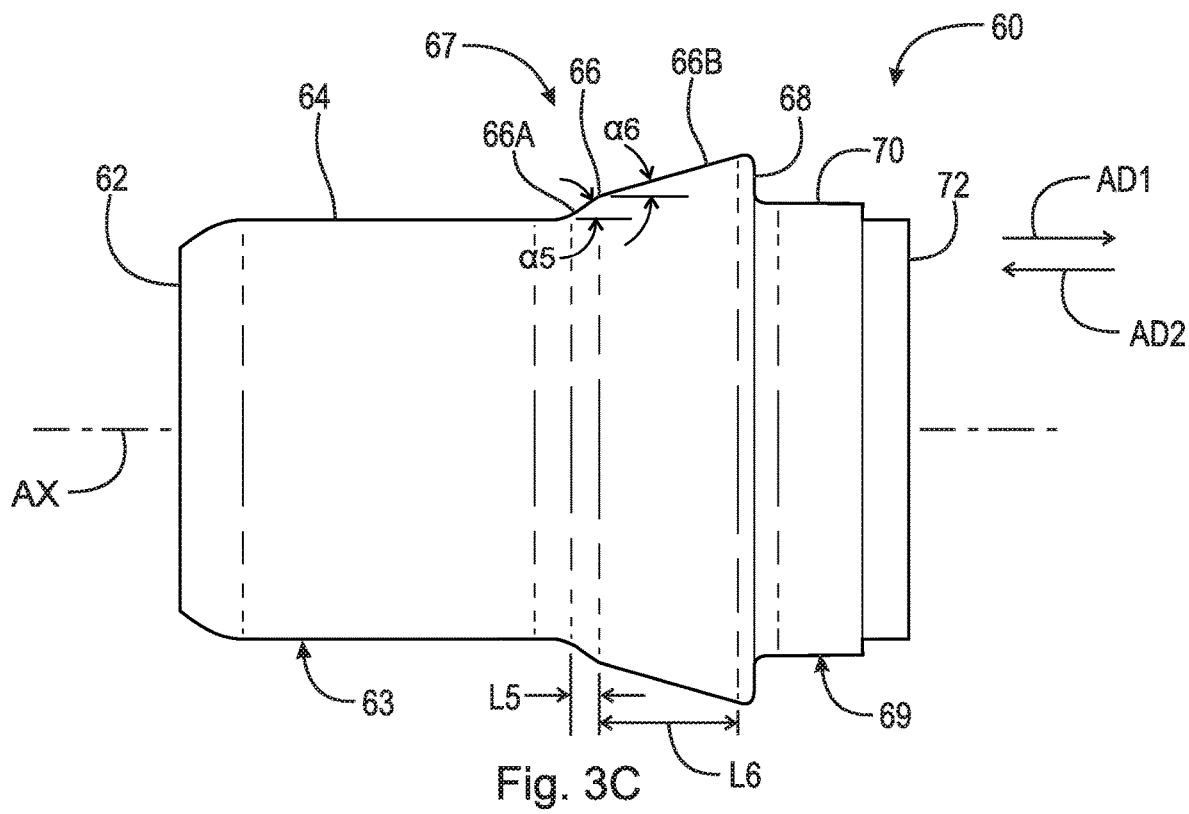
FIG. 3C is a side elevational view of a tube end form.

FIG. 3C is a side elevational view of tube end form 60. Tube end form 60 is generally cylindrical and comprises end 62, section 63, shoulder 67, section 69, and end 72. Section 63 is arranged between end 62 and shoulder 67 and comprises radially outward facing surface 64. Radially outward facing surface 64 includes a substantially constant diameter. In an example embodiment, radially outward facing surface 64 includes a variable diameter. Shoulder 67 is arranged between section 63 and section 69 and comprises radially outward facing surface 66. Section 69 is arranged between shoulder 67 and end 72 and comprises radially outward facing surface 70. Radially outward facing surface 70 includes a substantially constant diameter. In an example embodiment, radially outward facing surface 70 includes a variable diameter. Shoulder 67 is connected to radially outward facing surface 70 via shoulder surface 68. In an example embodiment, the diameter of radially outward facing surface 64 is equal to the diameter of radially outward facing surface 70. In an example embodiment, the diameter of radially outward facing surface 64 is not equal to the diameter of radially outward facing surface 70.

Radially outward facing surface 66 is generally a non-linear conical shape and increases in diameter in axial direction AD1. Radially outward facing surface 66 includes conical surface 66A and conical surface 66B. Conical surface 66A is arranged at angle α5 relative to horizontal axis AX, and has an adjacent side dimension of length L5. Conical surface 66B is arranged at angle α6 relative to horizontal axis AX, and has an adjacent side dimension of length L6. In the embodiment shown, angle α5 is not equal to α6 and length L5 is not equal to L6. In an example embodiment, α1 is 35° and α2 is 10°. It should be appreciated, that L5 is less than L3. In an example embodiment, radially outward facing surface 66 may comprise three or more conical surfaces.

Figure 3D:
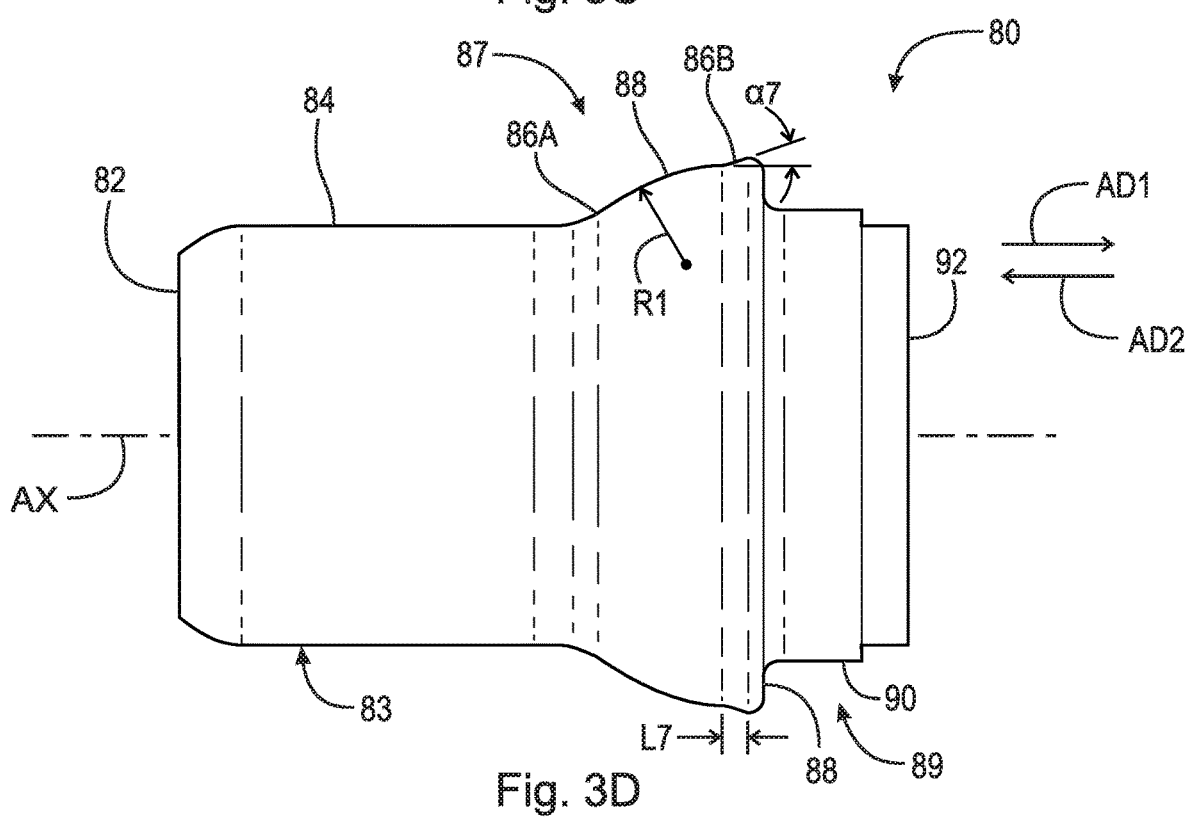
FIG. 3D is a side elevational view of a tube end form.

FIG. 3D is a side elevational view of tube end form 80. Tube end form 80 is generally cylindrical and comprises end 82, section 83, shoulder 87, section 89, and end 92. Section 83 is arranged between end 82 and shoulder 87 and comprises radially outward facing surface 84. Radially outward facing surface 84 includes a substantially constant diameter. In an example embodiment, radially outward facing surface 84 includes a variable diameter. Shoulder 87 is arranged between section 83 and section 89 and comprises radially outward facing surface 86. Section 89 is arranged between shoulder 87 and end 92 and comprises radially outward facing surface 90. Radially outward facing surface 90 includes a substantially constant diameter. In an example embodiment, radially outward facing surface 90 includes a variable diameter. Shoulder 87 is connected to radially outward facing surface 90 via shoulder surface 88. In an example embodiment, the diameter of radially outward facing surface 84 is equal to the diameter of radially outward facing surface 90. In an example embodiment, the diameter of radially outward facing surface 84 is not equal to the diameter of radially outward facing surface 90.

Radially outward facing surface 86 is generally a non-linear conical shape and increases in diameter in axial direction AD1. Radially outward facing surface 86 includes arcuate surface 86A and conical surface 86B. Arcuate surface 86A is arranged between radially outward facing surface 84 and conical surface 86B, and comprises radius R1. Conical surface 86B is arranged at angle α7 relative to horizontal axis AX, and has an adjacent side dimension of length L7. In an example embodiment, radially outward facing surface 86 may comprise three or more surfaces.

Figure 4A:
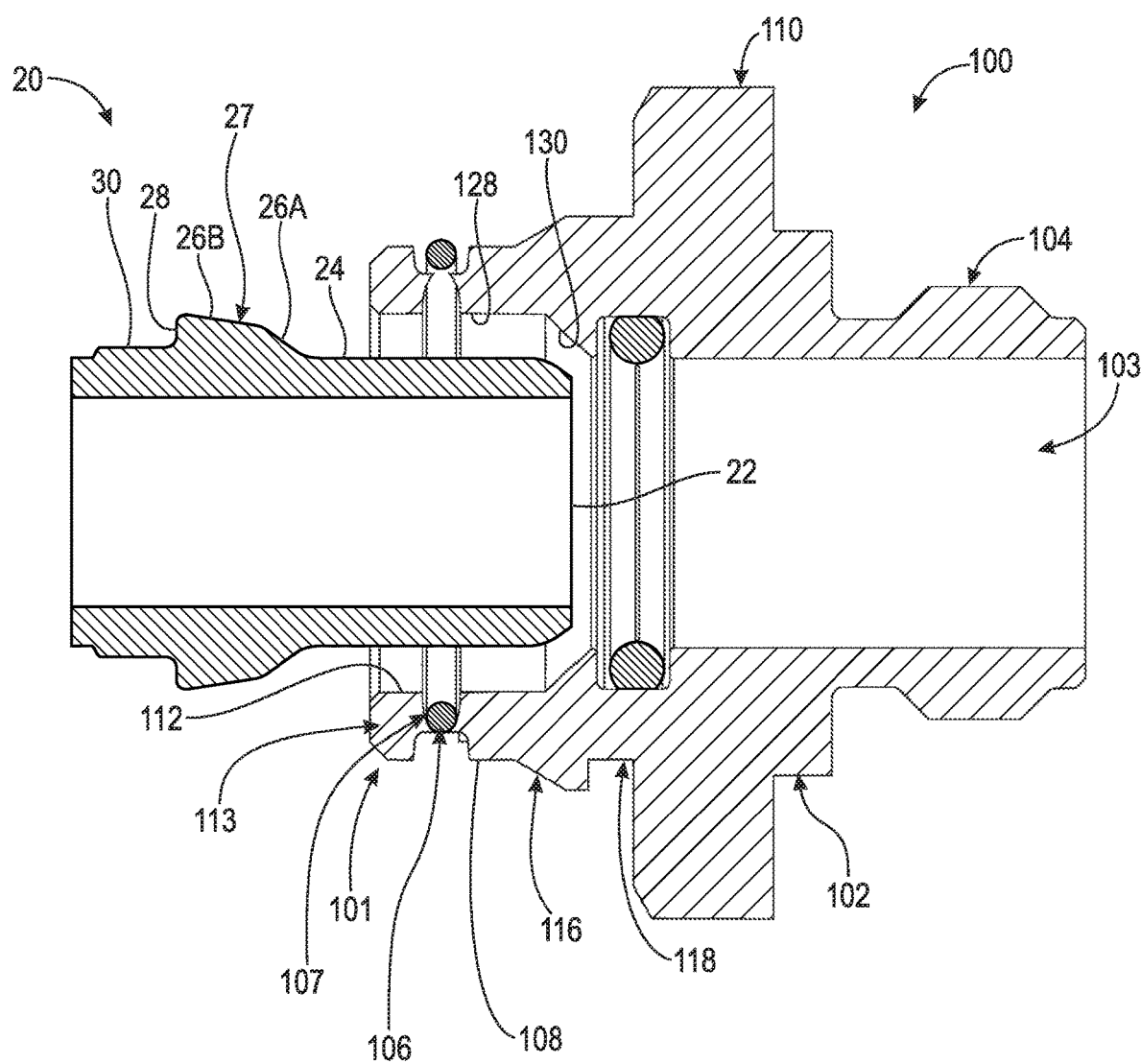
FIG. 4A is a cross-sectional view of the fluid connector shown in FIG. 2A taken generally along line 4-4 with a tube end form being inserted into the fluid connector.

FIG. 4A is a cross-sectional view of fluid connector 100 taken generally along line 4-4 in FIG. 2A, with tube end form 20 being inserted therein. It should be appreciated that the following discussion also applies to tube end forms 40, 60, and 80. End 22 is inserted into section 101 of fluid connector 100 as shown.

Figure 4B:
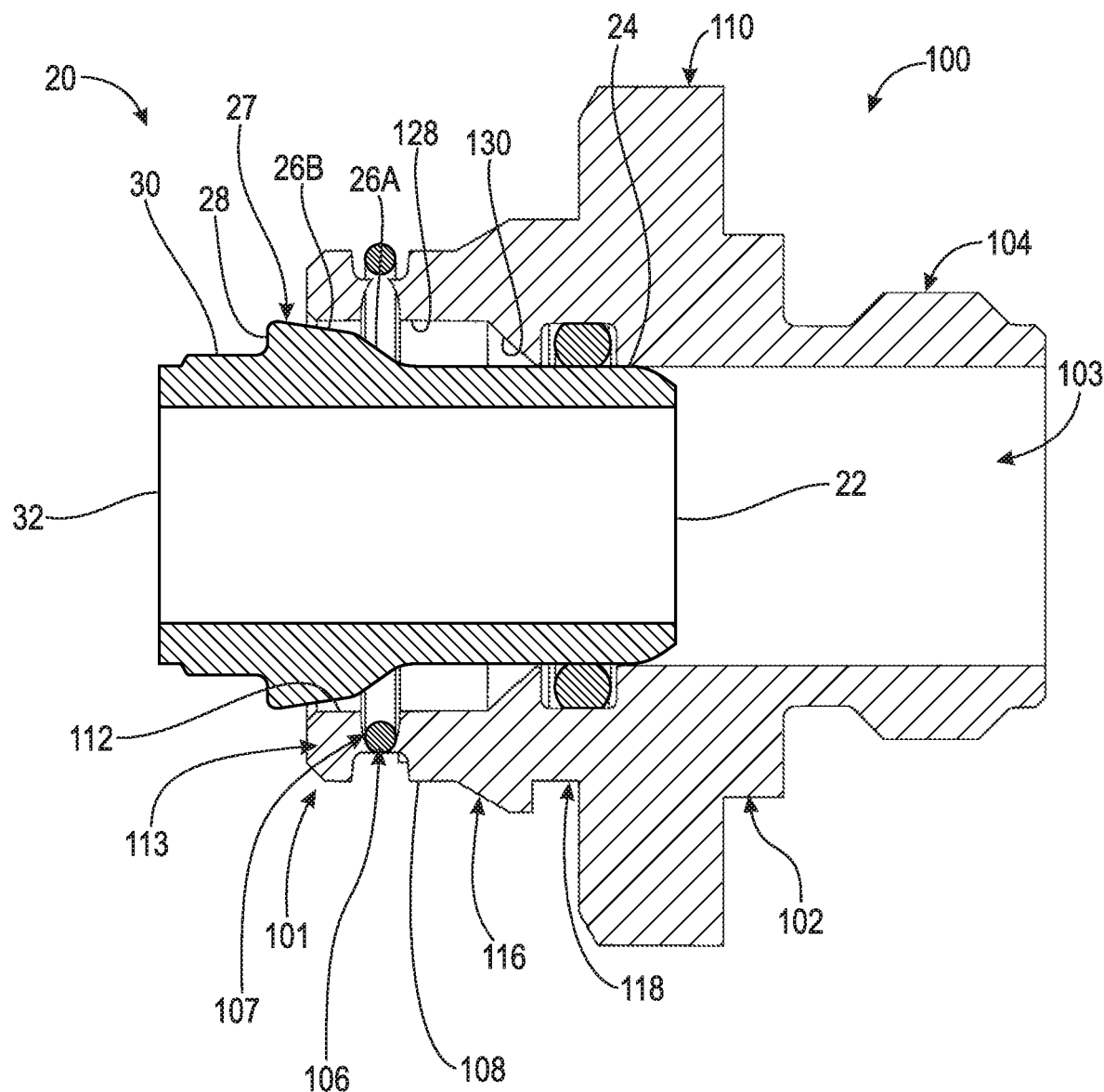
FIG. 4B is a cross-sectional view of the fluid connector shown in FIG. 4A with the tube end form being inserted into the fluid connector.

FIG. 4B is a cross-sectional view of fluid connector 100 shown in FIG. 4A with tube end form 20 being inserted therein. In FIG. 4B, tube end form 20 is further advanced within fluid connector 100 such that conical surface 26A is in contact with snap ring 106. At this point the required insertion force increases significantly, and as tube end form 20 is advanced within fluid connector 100, snap ring 106 expands radially outward.

Figure 4C:
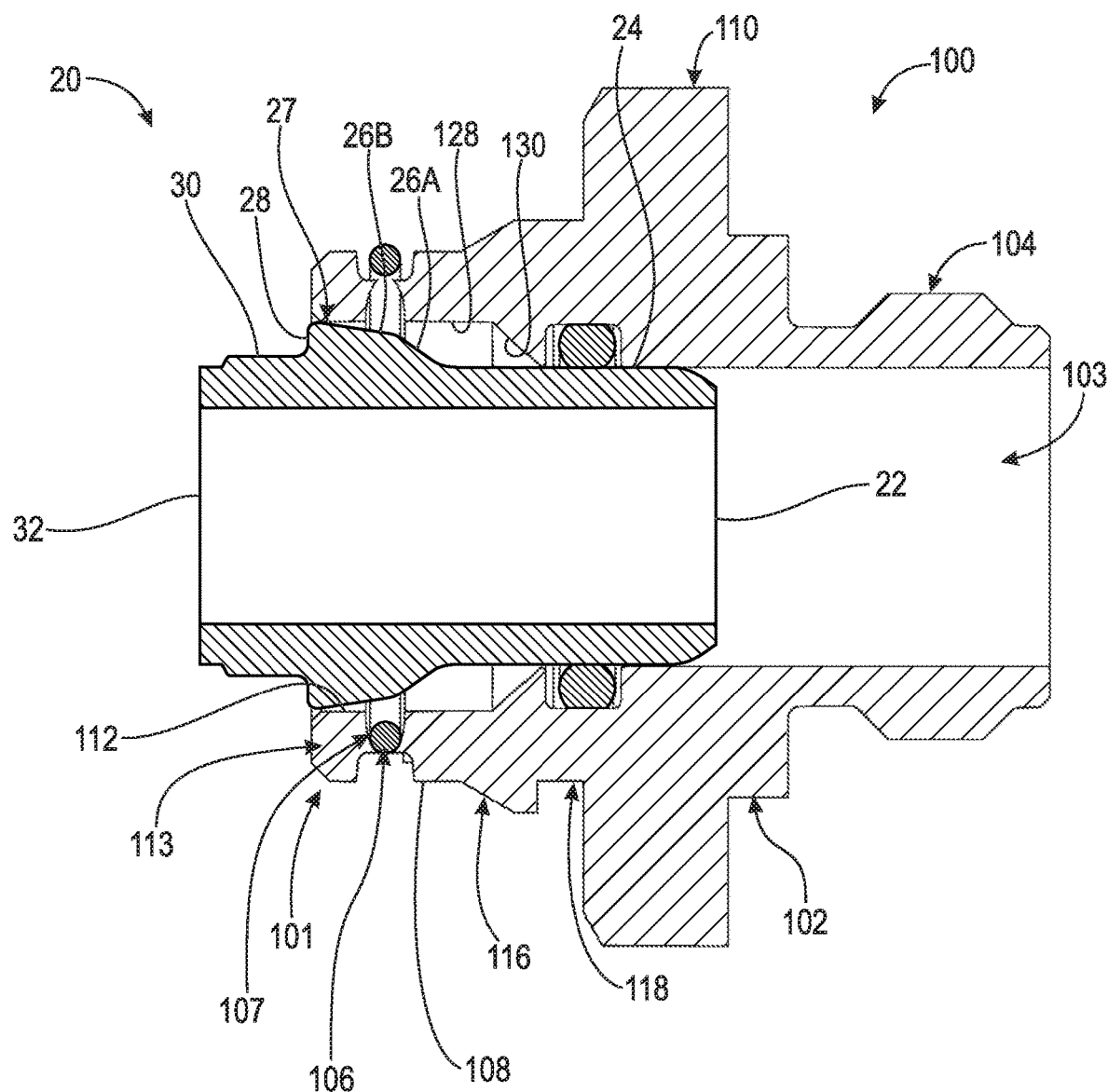
FIG. 4C is a cross-sectional view of the fluid connector shown in FIG. 4A with the tube end form being inserted into the fluid connector.

FIG. 4C is a cross-sectional view of fluid connector 100 shown in FIG. 4A with tube end form 20 being inserted therein. In FIG. 4C, tube end form 20 is further advanced within fluid connector 100 such that conical surface 26B is in contact with snap ring 106. The required insertion force may increase slightly, or decrease, upon crossing the threshold from conical surface 26A to conical surface 26B. Once snap ring 106 is in contact with conical surface 26B the required insertion force increases only slightly, because the angle of 26B, α2, is less than the angle of 26A, α1. As tube end form 20 is advanced within fluid connector 100, snap ring 106 expands radially outward.

Figure 4D:
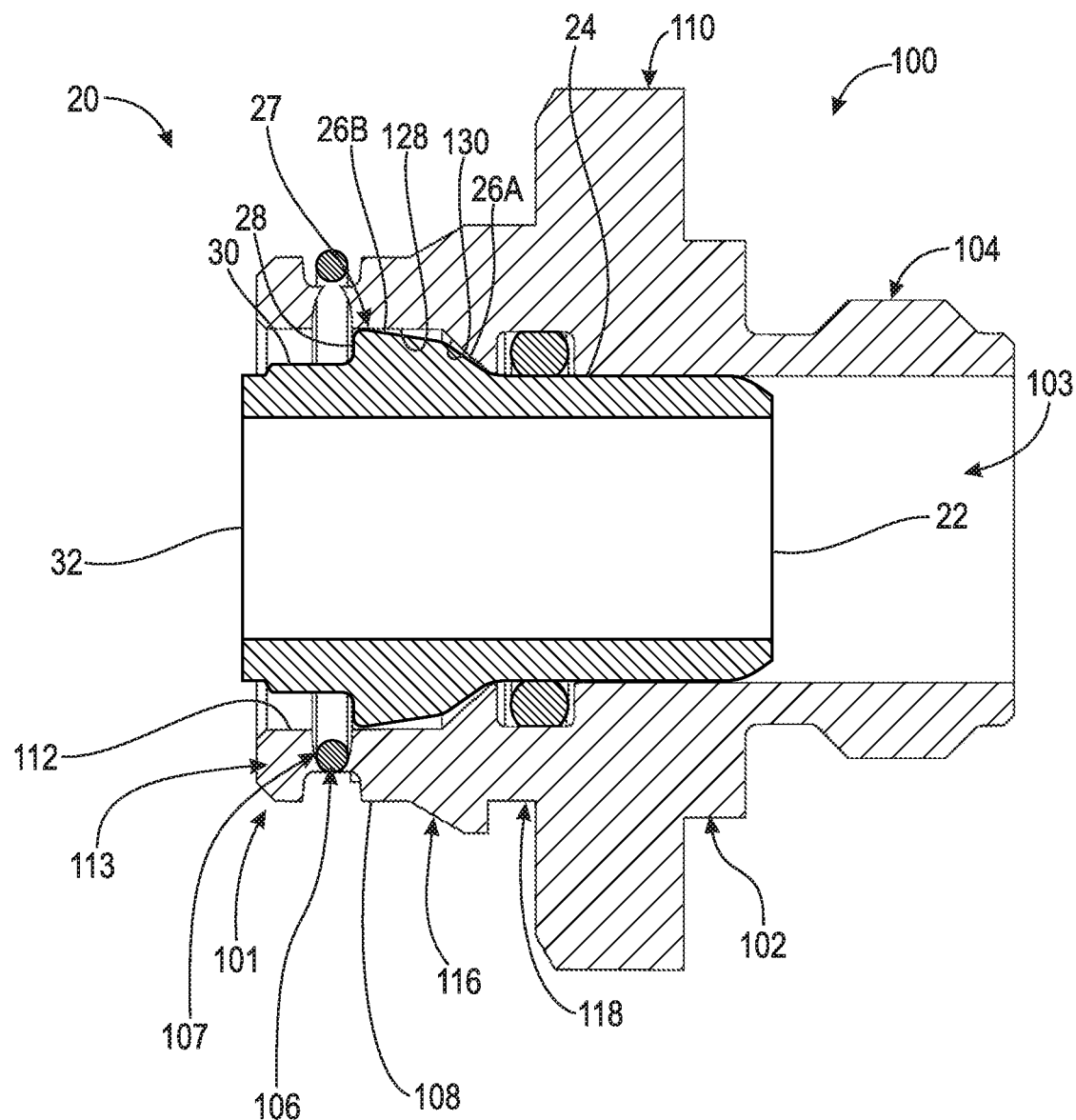
FIG. 4D is a cross-sectional view of the fluid connector shown in FIG. 4A with the tube end form fully inserted in the fluid connector, and, FIG. 5 is a side elevational view of a prior art tube end form.
Figure 5:
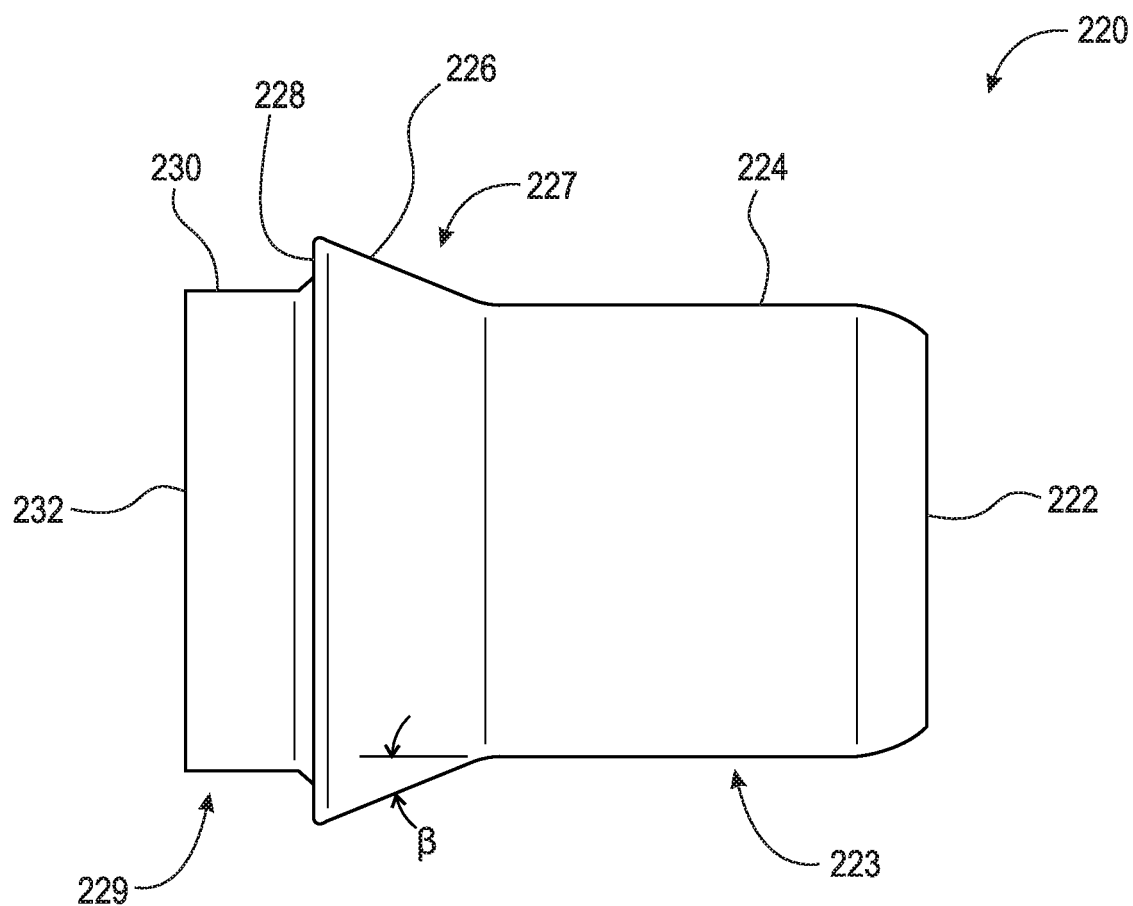

FIG. 4D is a cross-sectional view of fluid connector 100 shown in FIG. 4A with tube end form 20 fully inserted therein. In FIG. 4D, tube end form 20 is completely seated within fluid connector 100 such that snap ring 106 clears shoulder 27. Snap ring 106 contracts radially inward and may contact radially outward facing surface 30, and shoulder surface 28. Conical surface 26A may contact radially inward facing surface 130. Tube end form 20 is prevented from axial movement in a first axial direction by radially inward facing surface 130 and a second axial direction by snap ring 106.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

20 Tube end form
21 Through-bore
22 End
23 Section
24 Radially outward facing surface
26 Radially outward facing surface
26A Conical surface
26B Conical surface
27 Shoulder
28 Shoulder surface
29 Section
30 Radially outward facing surface
32 End
32 Tube end form
40 End
43 Section
44 Radially outward facing surface
46 Radially outward facing surface
46A Conical surface
46B Conical surface
47 Shoulder
48 Shoulder surface
49 Section
50 Radially outward facing surface
52 End
60 Tube end form
62 End
63 Section
64 Radially outward facing surface
66 Radially outward facing surface
66A Conical surface
66B Conical surface
67 Shoulder
68 Shoulder surface
69 Section
70 Radially outward facing surface
72 End
80 Tube end form
82 End
83 Section
84 Radially outward facing surface
86 Radially outward facing surface
86A Arcuate surface
86B Conical surface
87 Shoulder
88 Shoulder surface
89 Section
90 Radially outward facing surface
92 End
100 Fluid connector
101 Section
102 Section
103 Through-bore
104 Threads
106 Snap ring
107 Apertures
108 Surface
110 Head
112 Inner surface
113 Shoulder
114 Shoulder surface
116 Shoulder
118 Channel
128 Radially inward facing surface
130 Radially inward facing surface
220 Tube end form
222 End
224 Radially outward facing surface
226 Radially outward facing surface
228 Shoulder surface
230 Radially outward facing surface
232 End
L1 Length
L2 Length
L3 Length
L4 Length
L5 Length
L6 Length
L7 Length
α1 Angle
α2 Angle
α3 Angle
α4 Angle
α5 Angle
α6 Angle
α7 Angle
β Angle
R1 Radius
AD1 Axial direction
AD2 Axial direction

What is claimed is:

1. A fluid connection coupling, comprising:
a tube end form, including:
a first section including a first radially outward facing surface;
a second section including a second radially outward facing surface;
a shoulder axially arranged between the first and second sections, the shoulder including:
a first frusto-conical surface connected to and arranged at a first angle relative to the first radially outward facing surface; and,
a second frusto-conical surface arranged at a second angle relative to the first radially outward facing surface, the second frusto-conical surface connected to the first frusto-conical surface and the second radially outward facing surface via an axially facing shoulder surface, wherein a fillet exists at a point where the second frusto-conical surface meets the shoulder surface; and,
a through-bore extending completely linearly through the tube end form;
a fluid connector including an integrally formed frusto-conical radially inward facing surface; and, a snap ring;
wherein;
the second section further comprises a raised portion extending radially from the second radially outward facing surface, the raised portion abutting against the shoulder surface; and,
the tube end form is operatively arranged to be inserted into the fluid connector and secured therein via the snap ring and the frusto-conical radially inward facing surface.

2. The fluid connection coupling as recited in claim 1, wherein the first angle is not equal to the second angle.

3. The fluid connection coupling as recited in claim 2, wherein the first angle is greater than the second angle.

4. The fluid connection coupling as recited in claim 1, wherein:
the first frusto-conical surface comprises a first adjacent side length;
the second frusto-conical surface comprises a second adjacent side length; and,
the first adjacent side length is not equal to the second adjacent side length.

5. The fluid connection coupling as recited in claim 4, wherein the first adjacent side length is less than the second adjacent side length.

6. The fluid connection coupling as recited in claim 1, wherein:
in a first insertion state, the first frusto-conical surface engages the snap ring; and,
in a second insertion state, the second frusto-conical surface engages the snap ring.

7. The fluid connection coupling as recited in claim 1, wherein when the tube end form is fully inserted within the fluid connector:
the first frusto-conical surface is arranged proximate the frusto-conical radially inward facing surface;
the second frusto-conical surface is arranged proximate the snap ring; and,
the tube end form is prevented from further axial movement by the snap ring and the frusto-conical radially inward facing surface.

8. The fluid connection coupling as recited in claim 1, wherein:
the first radially outward facing surface abuts against the first frusto-conical surface and has a first diameter;
the second radially outward facing surface abuts against the second frusto-conical surface and has a second diameter; and,
the first diameter is not equal to the second diameter.

9. The fluid connection coupling as recited in claim 8, wherein the second diameter is greater than the first diameter.

10. A tube end form, comprising:
a first section including a first radially outward facing surface, the first section defining a first end;
a second section including a second radially outward facing surface, the second section defining a second end; and,
a shoulder axially arranged between the first and second sections, the shoulder including:
an arcuate surface extending from the first radially outward facing surface, the arcuate surface comprising a first adjacent length; and,
a third radially outward facing surface connected to and extending radially outward from the arcuate surface, the third radially outward facing surface comprising a second adjacent length, the first adjacent length being greater than the second adjacent length;
wherein:
the third radially outward facing surface is connected to the second radially outward facing surface via a shoulder surface, wherein a fillet exists at a point where the third radially outward facing surface meets the shoulder surface; and,
a single linear through-bore extends completely through the tube end form from the first end to the second end.

11. The tube end form as recited in claim 10, wherein the third radially outward facing surface is arranged at an angle relative to the first radially outward facing surface, the angle being greater than zero.

12. The tube end form as recited in claim 10, wherein the tube end form is operatively arranged to be inserted into a fluid connector, the fluid connector including:
a snap ring; and,
an integrally formed frusto-conical radially inward facing surface.

13. The tube end form as recited in claim 12, wherein:
in a first insertion state, the arcuate surface engages the snap ring; and,
in a second insertion state, the third radially outward facing surface engages the snap ring.

14. The tube end form as recited in claim 12, wherein when the tube end form is fully inserted within the fluid connector:
the arcuate section is arranged proximate the frusto-conical radially inward facing surface;
the third radially outward facing surface is arranged proximate the snap ring; and,
the tube end form is prevented from further axial movement by the snap ring and the frusto-conical radially inward facing surface.

15. The tube end form as recited in claim 10, wherein:
the first radially outward facing surface abuts against the shoulder and has a first diameter;
the second radially outward facing surface abuts against the shoulder and has a second diameter; and,
the first diameter is not equal to the second diameter.

16. The tube end form as recited in claim 15, wherein the second diameter is greater than the first diameter.

17. The tube end form as recited in claim 15, further comprising a third section including a fourth radially outward facing surface, wherein:
the fourth radially outward facing surface extends from the second section and has a third diameter; and,
the third diameter is equal to the first diameter.

18. The tube end form as recited in claim 17, wherein the second diameter is greater than the first diameter.

19. A fluid connection coupling, comprising:
a fluid connector, including:
an outward facing surface including an exterior opening annular groove, the exterior opening annular groove including one or more holes;
a snap ring arranged in the exterior opening annular groove, including a plurality of radially inward extending protrusions arranged to extend through the one or more holes; and,
a radially inward facing surface; and,
a tube end form, including:
a first section including a first radially outward facing surface;
a second section including a second radially outward facing surface; and, a shoulder axially arranged between the first and second sections, the shoulder including:
- a first frusto-conical surface connected to and arranged at a first angle relative to the first radially outward facing surface; and,
- a second frusto-conical surface arranged at a second angle relative to the first radially outward facing surface, the second frusto-conical surface connected to the first frusto-conical surface and the second radially outward facing surface via an axially facing shoulder surface, the second angle being less than the first angle;

wherein:
- the second section further comprises a raised portion extending radially from the second radially outward facing surface, the raised portion abutting against the shoulder surface;
- a through-bore extends completely through the tube end form in a singular linear direction;
- in a first insertion state, the first frusto-conical surface engages the snap ring; and,
- in a second insertion state, the second frusto-conical surface engages the snap ring.

* * * * *